United States Patent
Piira et al.

(10) Patent No.: US 10,574,611 B2
(45) Date of Patent: Feb. 25, 2020

(54) METHOD AND APPARATUS FOR AN INTERACTIVE ACTION LOG IN A COLLABORATIVE WORKSPACE

(71) Applicant: BlackBerry Limited, Waterloo (CA)

(72) Inventors: Antti Juhani Piira, Sunnyvale, CA (US); Rupen Chanda, San Francisco, CA (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/231,648

(22) Filed: Aug. 8, 2016

(65) Prior Publication Data
US 2018/0041457 A1 Feb. 8, 2018

(51) Int. Cl.
*H04L 12/58* (2006.01)
*H04L 29/08* (2006.01)

(52) U.S. Cl.
CPC .............. *H04L 51/16* (2013.01); *H04L 51/06* (2013.01); *H04L 51/32* (2013.01); *H04L 67/10* (2013.01)

(58) Field of Classification Search
CPC ......... H04L 51/06; H04L 51/16; H04L 51/32; H04L 67/10; G06Q 10/06; G06Q 10/10; Y04S 10/54; G06F 17/241
See application file for complete search history.

(56) References Cited

U.S. PATENT DOCUMENTS

| | | | |
|---|---|---|---|
| 7,568,151 B2 | 7/2009 | Bargeron et al. | |
| 8,996,985 B1* | 3/2015 | Johnston | G06F 17/241 715/230 |
| 2009/0070376 A1* | 3/2009 | Eom | G06F 17/211 |
| 2009/0327294 A1* | 12/2009 | Bailor | G06F 17/24 |
| 2012/0278401 A1* | 11/2012 | Meisels | G06F 17/24 709/206 |
| 2013/0124638 A1 | 5/2013 | Barreto et al. | |
| 2013/0297559 A1 | 11/2013 | Bailor et al. | |
| 2014/0358613 A1 | 12/2014 | Libin | |
| 2015/0121190 A1* | 4/2015 | Miyamoto | H04L 51/16 715/230 |
| 2017/0111300 A1* | 4/2017 | Devasthali | H04L 51/16 |

FOREIGN PATENT DOCUMENTS

GB    2499097 A    8/2013

OTHER PUBLICATIONS

European Patent Application No. 17184912.8, Extended European Search Report dated Sep. 29, 2017.
European Patent Application No. 17184912.8, Communication Pursuant to Article 94(3) EPC dated Nov. 14, 2019.

* cited by examiner

*Primary Examiner* — Abdulkader M Alriyashi
(74) *Attorney, Agent, or Firm* — Borden Ladner Gervais LLP; Todd Keeler

(57) ABSTRACT

A method and apparatus is provided to determine that a comment has been added to a document associated with the collaborative workspace, and display an entry associated with the comment in an activity log, the entry including a reply indicator to enable entering a reply to the comment. In an aspect, a reply entered via the entry is incorporated into the document.

9 Claims, 4 Drawing Sheets

METHOD AND APPARATUS FOR AN INTERACTIVE ACTION LOG IN A COLLABORATIVE WORKSPACE

TECHNICAL FIELD

The present disclosure relates to collaborative workspaces.

BACKGROUND

A collaborative workspace is a network-based environment that enables multiple users to work in collaboration with one another. In general, a collaborative workspace may be associated with a particular project and multiple users of the collaborative workspace may be members of a team that is associated with the project. Documents and other materials, such as for example text documents, scheduled meeting data, tasks, and other electronic file associated with the project, may be stored in the collaborative workspace such that project members may access these documents via the network to review and edit the documents utilizing various tools that may be available within the collaborative workspace.

A problem with collaborative workspaces is that information regarding the activity of the project members within the collaborative workspace is not readily available or accessible.

Improvements to collaborative workspaces is desired.

SUMMARY

One aspect of the disclosure provides a method in a collaborative workspace that includes determining that a comment has been added to a document associated with the collaborative workspace, and displaying an entry associated with the comment in an activity log, the entry including a reply indicator to enable a reply to the comment.

In a further aspect, the method includes incorporate the reply into the document in response to receiving a reply via the entry.

In a further aspect, the method includes determining whether a user has permission to reply to the comment, and in response to determining that the user has permission to reply, including the reply indicator in the displayed entry.

In a further aspect, determining that the user has permission to reply comprises determining that the user has write access to the document.

In a further aspect, determining that the user has permission to reply comprises determining that an author of the comment has directed the comment to the user.

In a further aspect, determining that the user has permission to reply is based on the user's access permissions within the collaborative workspace.

In a further aspect, the method includes determining whether to include a reply indicator in the displayed entry is context-based on a usage pattern of a user.

In a further aspect, the context-based determination comprises the comment being a reply to a previous comment by the user.

In a further aspect, the context-based determination comprises the user previously commenting on documents associated with the collaborative workspace.

Another aspect of the present disclosure provides an apparatus for a collaborative workspace includes a memory storing a document, a display, a processor in communication with the memory and the display, the processor configured to determine that a comment has been added to a document associated with the collaborative workspace, and display an entry associated with the comment in an activity log, the entry including a reply indicator to enable entering a reply to the comment.

In a further aspect, the processor is configured to incorporate the reply into the document in response to receiving a reply via the entry.

In a further aspect, the processor is configured to determine whether a user has permission to reply to the comment, and in response to determining that the user has permission to reply, including the reply indicator in the displayed entry.

In a further aspect, determining that the user has permission to reply comprises determining that the user has write access to the document.

In a further aspect, determining that the user has permission to reply comprises determining that an author of the comment has directed the comment to the user.

In a further aspect, determining that the user has permission to reply is based on the user's access permissions within the collaborative workspace.

In a further aspect, the processor is configured to determine whether to include a reply indicator in the displayed entry is context-based.

In a further aspect, the context-based determination comprises the comment being a reply to a previous comment by the user.

In a further aspect, the context-based determination comprises the user previously commenting on documents associated with the collaborative workspace.

DRAWINGS

The following figures set forth embodiments in which like reference numerals denote like parts. Embodiments are illustrated by way of example and not by way of limitation in the accompanying figures.

DETAILED DESCRIPTION

Figure 1:
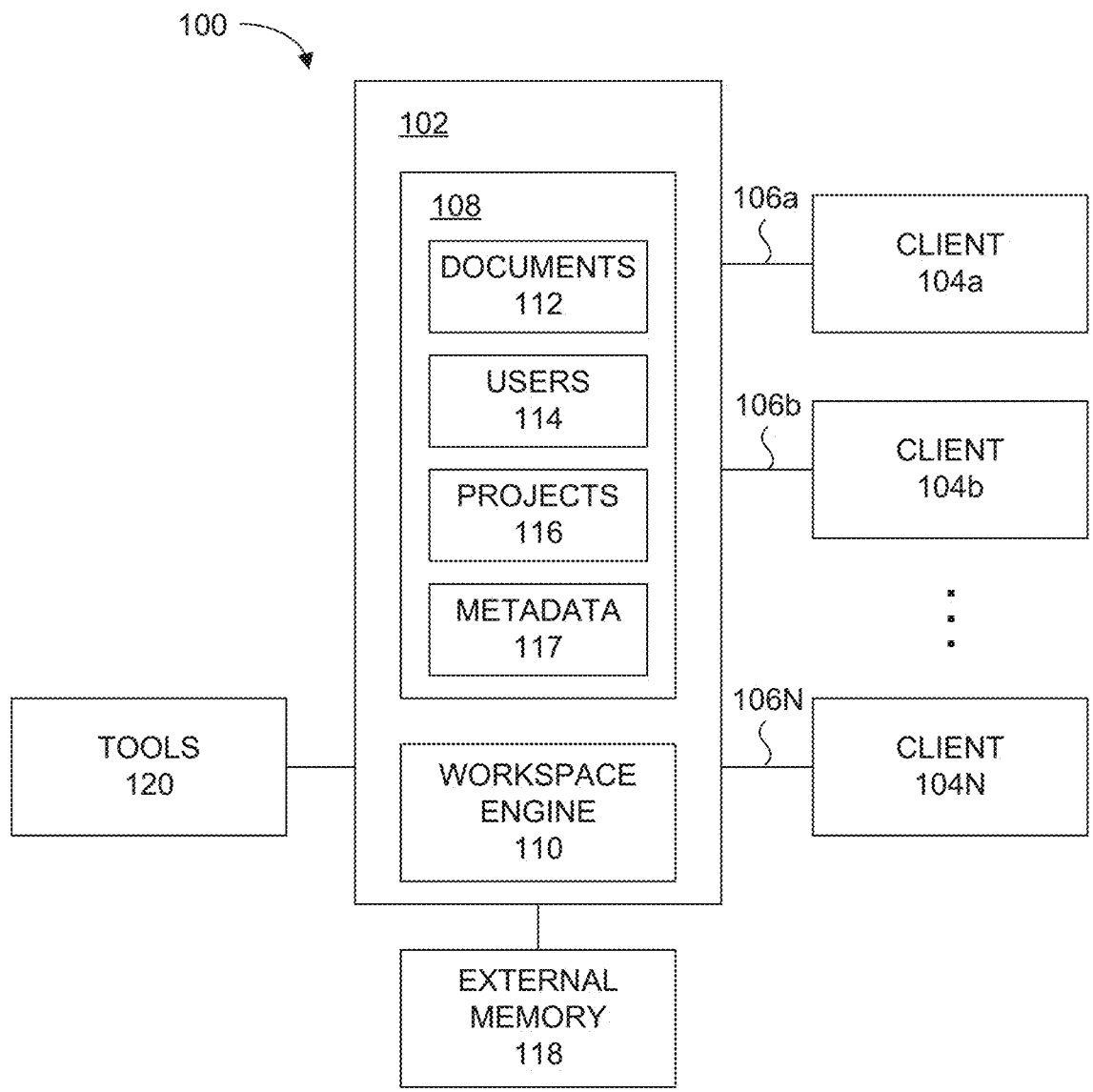
FIG. 1 is a schematic representation of a system for providing a collaborative workspace according to an embodiment.

The following describes an interactive activity log for a collaborative workspace. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 shows an example system 100 for providing a network-based collaborative workspace. The system 100 includes a collaborative workspace server 102 and one or more client devices 104*a*-104N. Each client device 104*a*-

104N communicates with the server 102 via a respective connection 106a-106N. Each of the connections 106a-106N may be any suitable type of connection that facilitates communication between the respective client device 104a-104N and the server 102. Suitable connection types include, for example, local area network (LAN) connections, a wide area network (WAN) connections, internet connections, or cellular connections.

Each of the client devices 104a-104N may be, for example, a desktop computer or a portable electronic device such as a smart phone, a tablet computer, or a laptop computer, or any other device that is capable of communicating with the server and providing access to a collaborative workspace. Each of the client devices 104a-104N may be associated with one or more users.

The collaborative workspace server 102 includes a memory 108 and a workspace engine 110. The memory 108 stores information related to the collaborative workspace in various databases such as, for example, a documents database 112, a user database 114, a projects database 116, and a metadata database 117.

The documents database 112 is a database of files associated with the collaborative workspace. "Documents", as the term is used herein, may refer to any type of electronic file including, for example, word processor files, spreadsheets, emails, instant messages, group chat messages, calendar data files such as for example scheduled calendar events, picture files, presentations, tasks, and program code.

The user database 114 includes information related to users that are associated with the collaborative workspace. User information stored in the user database 114 may include, for example, the user's name, their username and password for accessing the collaborative workspace, information regarding particular client devices associated with the user, projects that the user is a member of, and contact information.

The project database 116 includes information related to the projects created within the collaborative workspace. The information in the project database 116 facilitates, for example, dividing the collaborative workspace into separate projects. The information stored in the project database 116 may include, for example, a project name for each project, correlation information for determining which documents stored in the document database 112 are associated with which projects and which users stored in the user database 114 are members of which projects. In addition, the project database 116 may include information related to the permissions that are associated with each project member. For example, the permissions associated with a user may be utilized to determine which documents that particular user has access to within a particular project. For example, a particular user may only have access to a subset of the documents associated with the project, and of that subset of documents, the user may only have write access to a smaller subset of documents such that the user can only perform edits to those documents in the smaller subset.

The metadata database 117 includes metadata regarding the collaborative workspace such as, for example, information regarding activity of the users within the collaborative workspace. For example, the information stored in the metadata database 117 may include, for example, what activity was performed, which user performed the activity, when the activity was performed, where the activity was performed, i.e. the location of the client device 104a-104N used by the user when performing the activity, which project the activity relates to, which document the activity relates to.

Although FIG. 1 shows the document database 112, user database 114, project database 116, and metadata database 117 as separate databases within one memory 108, the information stored in these databases could alternatively be stored in a single database within the memory 108. Alternatively, the databases 112, 114, 116 may be stored on a plurality of memories. Further, although FIG. 1 shows the document database 116, the user database 114, the project database 116, and metadata database 117 as stored in the memory 108 of the server, some or all of the information stored in these databases 112, 114, 116, 117 may be stored in one or more memories external to the server 102 such as, for example, external memory 118. The server 102 may be connected to the external memory 118 by any connection suitable for enabling communication between the server 102 and the external memory 118 including, for example, a LAN connection, a WAN connection, an internet connection, or a cellular connection.

The workspace engine 110 communicates with the client devices 104a-104N to enable the client devices 104a-104N to access the collaborative workspace. The workspace engine 110 may be provided through hardware, software, or a combination of hardware and software. The workspace engine 100 may be provided by a processor executing processor executable code stored, for example, in the memory 108 or included on the processor itself as firmware.

The workspace engine 110 provides an interface for a user, utilizing one of the client devices 104a-104N, to access and edit documents within the collaborative workspace utilizing one or more software tools stored in the tools database 120. Software tools stored in the tools database 120 may include, for example, word processor applications, presentation applications, spreadsheet applications, email applications, instant messaging applications, group chat applications, calendar applications, task management applications, program code editing applications, program code review applications, and audio and/or video conferencing applications.

Although FIG. 1 shows that the tools database 120 is external to the server 102, the tools database 120 may alternatively, or additionally, be included within the server 102 such as, for example, within the memory 108. Alternative, or additionally, the software tools utilized to access and edit the documents stored in the documents database 112 may be stored locally on the client devices 104a-104N.

Although FIG. 1 shows a single workspace engine 110 located at the server 102, in an alternative embodiment each client device 104a-104N may include its own workspace engine for accessing and interacting with the collaborative workspace.

The workspace engine 110 generates a graphical user interface (GUI) displayable on a display (not shown) of the client device 104a-104N utilized by a user to access the collaborative workspace. The GUI may facilitate, for example, the user searching for and interacting with the documents and the other members of a particular project in the collaborative workspace. The GUI may also provide activity information that is generated by the workspace engine 110. The activity information includes metadata associated with the collaborative workspace such as, for example, whether, and by whom, any documents associated with the project have been added or revised within the document database 112, whether any meetings between project members are upcoming, or have occurred, and who participated, and whether any tasks are outstanding or coming due.

In an aspect of the present disclosure, the activity information generated by the workspace engine 110 is accessible to users as entries in an activity log. The interactive activity log may be included in the GUI displayed on the client device 104a-104N. The activity log may, for example, be continuously or periodically updated while a user is accessing the collaborative workspace. For example, if an action is performed while a user is accessing the collaborative workspace, the activity log of that user is updated to display the new activity to the user. The activity log may be interactive such that a user may, for example, interact with documents associated with the entries through the activity log without having to open the document directly.

Figure 2:
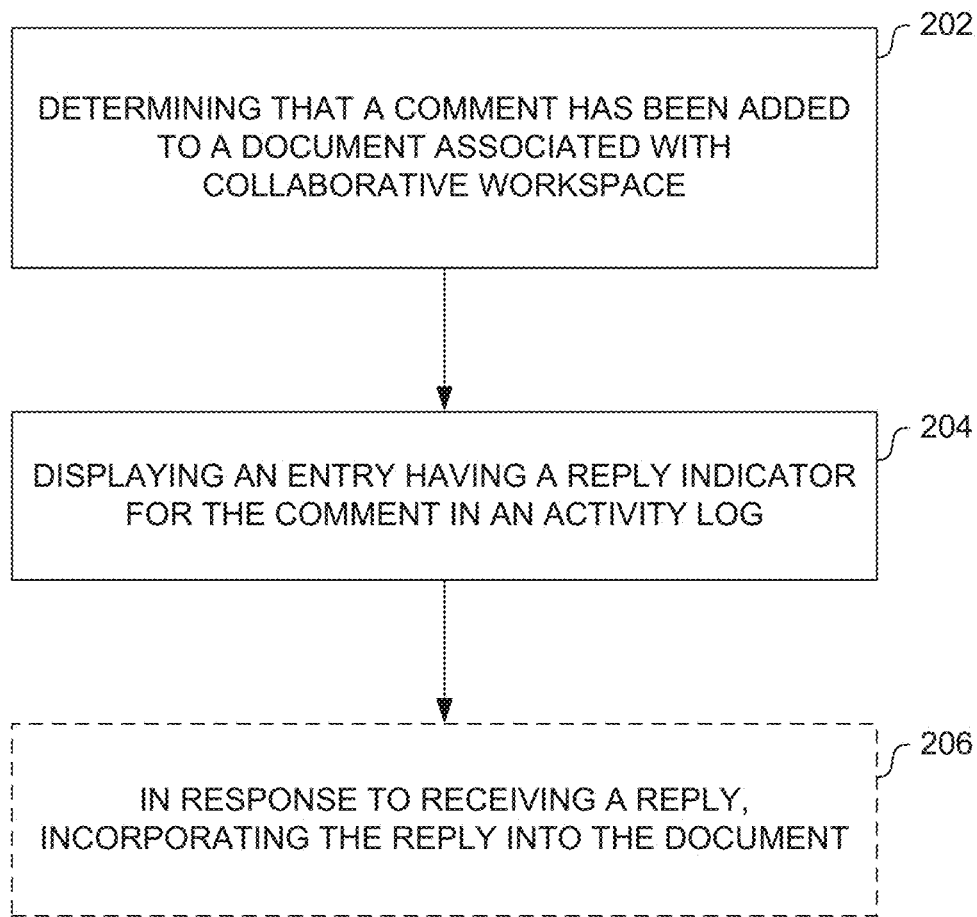
FIG. 2 is a flow chart of a method for providing an interactive activity log according to an embodiment.

FIG. 2 is a flow chart illustrating a method for generating an interactive activity log in a collaborative workspace. The method may be performed by, for example, the workspace engine 110 of the system 100 shown in FIG. 1. Alternatively, the method may be performed by one of the client devices 104a-104N.

At 202, a determination is made whether a comment has been added to a document associated with the project. The determination at 202 may be made, for example, by comparing the current version of the document stored in the documents database 112 to the version of the document that the user last viewed, or the version of the document the was the most current version at the time that the user last accessed the collaborative workspace. Alternatively, the determination may be made that the comment was added to the document within a predetermined time period prior to the determination. Alternatively, or additionally, the determination may include determining that the comment was addressed to the user, or otherwise directed to the user in some manner.

When a comment is determined to have been added to a document, an entry associated with the comment is displayed in an activity log at 204. The entry for the comment may be displayed, together with the other entries in the interactive activity log, on a display of the client devices 104a-104N utilized by the user to access the collaborative workspace. The entry includes a reply indicator that facilitates the user entering a response to the comment directly within the activity log without opening the document. The reply indicator may be, for example, a selectable feature that, when selected, facilitates that user entering a reply into a text box. The selectable features may be, for example, the text box itself, or may be an icon or other feature that the user may select to cause a text box to be displayed.

In an embodiment, the inclusion of a reply indicator in the entry of the activity log may be user-dependent. For example, the entry may include the reply indicator only for users having certain permissions within the document or within the collaborative workspace generally. In one example, a user having permission to make edits to the document in which the comment is associated, or to make edits to the documents in the workspace generally, may have a reply indicated included the displayed entry, whereas a user without such permission to makes edits would not have a reply indicator displayed in the entry associated with the comment displayed in the activity log for that user. In another example, the permissions may be permissions associated with a tool of the collaborative workspace such as, for example, a task tracking tool. For example, if a permission of the task tracking tool is that the user is responsible for approving the document in which the comment is included, or the documents in the workspace generally, then that entry associated with the comment is displayed with the reply indicator in the activity log displayed for that user. The user's permission to approve the document in this example may relate to approval of the document as a whole, or may relate only to approval of a particular portion of the document in which the comment appears.

Alternatively, or additionally, the inclusion of the reply indicator in the entry included in the activity log of a particular user may be context-based. In one example, if the comment is directed to a particular user, or the comment specifies in some way that a response is requested from a particular user, the entry for the comment displayed in that user's activity log includes the reply indicator but will not appear in an activity log displayed to another user. In another example, if the comment associated with the entry is, itself, a reply to a previous comment from a user, then the entry in the activity log displayed for that user may include a reply indicator.

In another example of context-based inclusion of a reply indicator, analysis of the activity of the user's within the document that the comment is included in, or activity within the collaborative workspace generally, may be performed to determine whether a reply indicator should be included for that user. For example, if the user is determined to frequently respond to comments within the document including the comment, or within the documents of the collaborative workspace generally, then the entry associated with the comment may include a reply indicator in the activity log displayed for that user. For example, reply indicators may be displayed if the user has previously replied to a comment within that document.

Optionally, at 206, if the reply indicator is selected and a reply to the comment is received through the activity log, then the reply is incorporated into the document. The incorporation of the reply into the document may be performed without, for example, the document being opened by the user entering the reply. In this manner, the user is able to input a reply to a comment into the document from the activity log, without having to access the document directly. The reply may be incorporated into the document as a new comment, or as an extension of the existing comment that is being replied to. Because the user does not have to open the document and locate the comment in order to enter a reply, less time is spent by the user, which increases the overall efficiency within the collaborative workspace. The next time the user opens the document they will see the reply already in the document.

The reply may be incorporated into the document stored within the collaborative workspace such as, for example, in the document database 112 of the memory 108 described above and shown in FIG. 1. Alternatively, or additionally, the reply may be incorporated into the document stored at one or more of the client devices 104a-104N. For example, the reply may be incorporated into the document stored within the collaborative workspace, then a synchronization routine may be performed such that any versions of the document stored locally at any of the client devices 104a-104N is replaced with the updated document that includes the reply to the comment.

Figure 3:
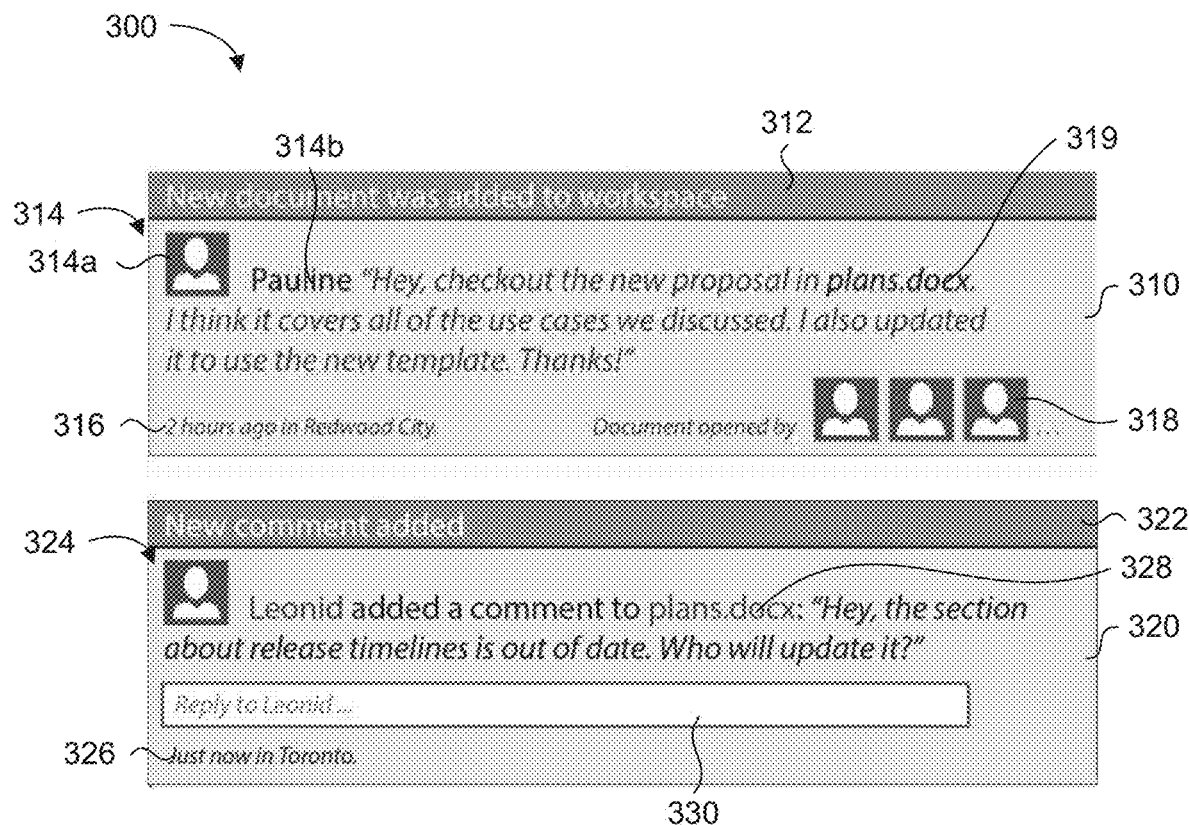
FIG. 3 is a schematic representation of an example of an interactive activity log according to the embodiment shown in FIG. 2.

Referring now to FIG. 3, an example interactive activity log 300 that may be displayed to a user of the collaborative workspace is shown. The example interactive activity log includes a first entry 310 and a second entry 320.

The example first entry 310 relates to an action of adding a new document, "plans.docx", to the workspace. The example second entry 320 relates to an action of a new comment being added to the documents "plans.docx". The second entry 320 in the activity log 300 is displayed according to the method described above with reference to FIG. 2.

The interactive activity log 300 may include more or less than two entries, and the entries may relate to other activities than the first and second entries shown in FIG. 3. For example, as described above, activities that may be associated with entries included in a displayed interactive activity log 300 may include revisions to a document, a meeting between project members having occurred, coming up in the future, or being proposed, and outstanding tasks that are coming due. Other examples of entries that may be included in the activity log 300 include "Antti, Pauline and Leonid had a meeting about plans.docx" and "Alan assigned a task to Rupen".

The example first entry 310 shown in FIG. 3 includes text 311 that, for example, the author of the newly created document has included that describes the new document. The example first entry 310 shown in FIG. 3 includes other features to provide additional information related to the action. For example, the first entry 310 includes a header 312, a user indicator 314, a time/location indicator 316, an opened-by indicator 318, and a document link 319.

The header 312 briefly describes the action that the first entry 310 relates to. The user indicator 314 indicates the user who performed the activity associated with the first entry 310. In the example first entry 310 shown in FIG. 3, the user indicator 314 includes a photo 314a of the user as well as the user's name 314b. The time/location indication 316 indicates where and when the action was performed. The opened-by-indicator 318 indicates which members of the project have opened or accessed the newly created document. The document link 319 may be, for example, a hyperlink that links to the "plans.docx" document such that when the document link 319 is selected the document plans.docx is opened utilizing an appropriate software tool.

Similar to the first entry 310, the second entry 320 includes a header 322, a user indicator 324, a time/location indicator 326, and a document link 328. Similar to the document link 319, the document link 328 may be a hyperlink that links to the "plans.docx" document in which the comment is included. However, because the second entry 320 is associated with a comment that may be entered at a specific location within the document, the document link 328 may optionally be configured such that, when the document link 328 is selected, the document is opened to the location of the comment. By opening the document to the location of the comment, the user may review the comment and the text of the document that the comment relates to without having to open the document and search manually for the comment, reducing the time required for the user to review the comment.

Figure 4:
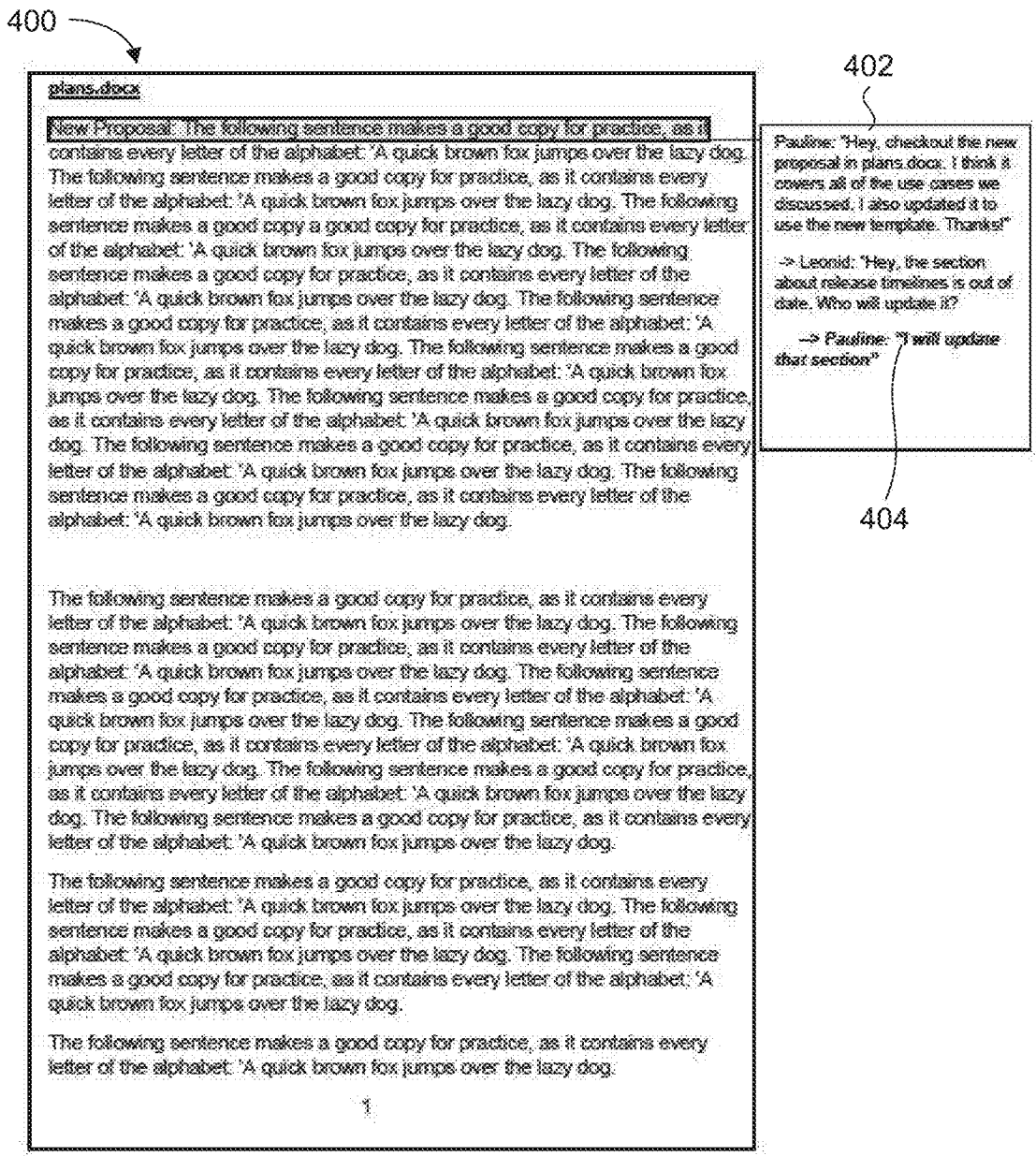
FIG. 4 is a representation of an example document which may be modified in response to one or more replies entered vie an interactive activity log according to the embodiment shown in FIG. 3.

As described above, the second entry 320 also includes a reply indicator that facilitates a user entering a reply to the comment associated with the second entry 320. The reply indicator in the example second entry 320 shown in FIG. 3 is a text box 330. However, as described above, other reply indicators are possible. A reply entered via the text box 330 may be displayed in the interactive activity log 300, either by incorporating the reply into the second entry 320 or by displaying a new entry for the reply. Additionally, or alternatively, when a reply is entered via the text box 330, the reply may be incorporated into the document. In the example shown in FIG. 3, the reply entered into reply indicator 330 may be incorporated into plans.docx, shown in the example plans.docx document 400 shown in FIG. 4, without the requirement for the user to open and edit the document. The reply may be incorporated into the document as a new comment, or as an extension of the existing comment that is being replied to. As shown in the example document of FIG. 4, the reply is included as an extension 404 to the existing comment 402.

Displaying an activity log facilitates providing information regarding the activity of the project members within the collaborative workspace that would not otherwise be readily available or accessible. By displaying a reply indicator in entries associated with comments entered into a document, a user may respond to the comment within the activity log, without having to open the document and locate the comment in order to reply, increasing the efficiency of the document review process compared to prior art collaborative workspaces.

The scope of the claims should not be limited by the preferred embodiments set forth in the examples, but should be given the broadest interpretation consistent with the description as a whole.

The invention claimed is:

1. A method in a collaborative workspace comprising:
   determining that a comment has been added to a document associated with the collaborative workspace;
   displaying an entry associated with the comment in an activity log that is separate from the document;
   in response to determining, based on a user's permissions associated with the document, that the user has write access to the document, the comment is a reply to a previous comment authored by the user, or the user has permission within the collaborative workspace to approve the document:
      displaying the entry includes displaying a reply indicator to enable a reply to the comment associated with the entry;
      receiving a selection of the reply indicator and a reply to the comment via the entry; and
      in response to receiving the reply, incorporating the reply into the document without displaying the document; and
   in response to determining, based on the user's permissions associated with the document, that the user does not have write access to the document, the comment is not a reply to a previous comment authored by the user, and the user does not have permission within the collaborative workspace to approve the document, displaying the entry without the reply indicator.

2. The method according to claim 1, further comprising determining whether to include a reply indicator in the displayed entry is context-based on a usage pattern of a user.

3. The method according to claim 2, wherein the context-based determination comprises the comment being a reply to a previous comment by the user.

4. The method according to claim 2, wherein the context-based determination comprises the user previously commenting on documents associated with the collaborative workspace.

5. An apparatus for a collaborative workspace comprising:
   a memory storing a document;
   a display;
   a processor in communication with the memory and the display, the processor configured to:
      determine that a comment has been added to a document associated with the collaborative workspace;
      display an entry associated with the comment in an activity log that is separate from the document;
      in response to determining, based on a user's permissions associated with the document, that the user has write access to the document, the comment is a reply to a previous comment authored by the user, or the user has permission within the collaborative workspace to approve the document:
  displaying the entry includes a reply indicator to enable entering a reply to the comment associated with the entry;
  receive a selection of the reply indicator and a reply to the comment via the entry; and
  in response to receiving the reply, incorporating the reply into the document without displaying the document; and
in response to determining, based on the user's permissions associated with the document, that the user does not have write access to the document, the comment is not a reply to a previous comment authored by the user, and the user does not have permission within the collaborative workspace to approve the document, displaying the entry without the reply indicator.

6. The apparatus according to claim 5, wherein the processor is further configured to determine whether to include a reply indicator in the displayed entry is context-based.

7. The apparatus according to claim 6, wherein the context-based determination comprises the comment being a reply to a previous comment by the user.

8. The apparatus according to claim 6, wherein the context-based determination comprises the user previously commenting on documents associated with the collaborative workspace.

9. A non-transitory computer-readable medium having stored thereon a computer-readable code executable by a processor to cause the processor to:
  determine that a comment has been added to a document associated with the collaborative workspace;
  display an entry associated with the comment in an activity log that is separate from the document;
  in response to determining, based on a user's permissions associated with the document, that the user has write access to the document, the comment is a reply to a previous comment authored by the user, or the user has permission within the collaborative workspace to approve the document:
    displaying the entry includes a reply indicator to enable entering a reply to the comment associated with the entry;
    receive a selection of the reply indicator and a reply to the comment via the entry; and
    in response to receiving the reply, incorporating the reply into the document without displaying the document; and
  in response to determining, based on the user's permissions associated with the document, that the user does not have write access to the document, the comment is not a reply to a previous comment authored by the user, and the user does not have permission within the collaborative workspace to approve the document, displaying the entry without the reply indicator.

* * * * *